US006672354B2

(12) United States Patent
Lemens et al.

(10) Patent No.: US 6,672,354 B2
(45) Date of Patent: Jan. 6, 2004

(54) GAUGE ASSEMBLY FOR A MASTER PROCESSING APPARATUS

(75) Inventors: Paul J. Lemens, Scottsdale, AZ (US); Joseph E. Velasquez, Gilbert, AZ (US); Daniel G. Reed, Mesa, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 10/163,341

(22) Filed: Jun. 7, 2002

(65) Prior Publication Data

US 2003/0010456 A1 Jan. 16, 2003

Related U.S. Application Data

(60) Provisional application No. 60/304,748, filed on Jul. 13, 2001.

(51) Int. Cl.[7] .............................................. B32B 31/00
(52) U.S. Cl. ..................... 156/378; 156/555; 156/582
(58) Field of Search ...................... 156/64, 378, 555, 156/580, 582, 583.1; 100/155 R, 160, 176

(56) References Cited

U.S. PATENT DOCUMENTS

| 1,542,808 | A | | 6/1925 | Adams |
| 3,687,389 | A | | 8/1972 | Adams |
| 3,701,493 | A | | 10/1972 | Welsch et al. |
| 3,854,668 | A | | 12/1974 | Rudd |
| 4,204,180 | A | | 5/1980 | Usui et al. |
| 4,422,402 | A | | 12/1983 | Ogihara |
| 4,620,184 | A | | 10/1986 | Nedstedt |
| 4,947,472 | A | | 8/1990 | Maeda |
| 5,580,417 | A | | 12/1996 | Bradshaw |
| 5,584,962 | A | | 12/1996 | Bradshaw et al. |
| 6,024,322 | A | | 2/2000 | Skelly et al. |
| 6,135,384 | A | | 10/2000 | Skelly et al. |
| 6,136,142 | A | * | 10/2000 | Kitagawa et al. ........... 156/555 |
| 6,176,286 | B1 | | 1/2001 | Kitagawa et al. |
| 6,294,033 | B1 | * | 9/2001 | Fukuoka et al. ............... 156/64 |
| 6,315,020 | B1 | | 11/2001 | Seki |
| 6,427,744 | B2 | | 8/2002 | Seki et al. |
| 6,431,243 | B1 | | 8/2002 | Ito et al. |
| 6,431,244 | B1 | | 8/2002 | Moriguchi et al. |
| 6,523,592 | B2 | | 2/2003 | Kuki |
| 6,550,516 | B2 | | 4/2003 | Moriguchi et al. |
| 6,578,618 | B2 | | 6/2003 | Ito et al. |
| 2001/0004922 | A1 | | 6/2001 | Seki et al. |

FOREIGN PATENT DOCUMENTS

| EP | 0 800 926 A1 | 10/1997 |
| EP | 1 046 495 A2 | 10/2000 |
| JP | 60-87158 | 5/1985 |
| JP | 11-35205 | 1/1999 |
| JP | 11-245296 | 9/1999 |
| JP | 11-245297 | 9/1999 |
| JP | 11-245299 | 9/1999 |
| JP | 11-254528 | 9/1999 |
| JP | 11-278416 | 10/1999 |
| JP | 2000037775 | 2/2000 |

(List continued on next page.)

Primary Examiner—James Sells
(74) Attorney, Agent, or Firm—Pillsbury Winthrop LLP

(57) ABSTRACT

A master processing apparatus for use with a pair of removable feed rolls comprises a frame, a master processing assembly, and a gauge assembly. The removable feed rolls carry a supply of stock material to be unwound, at least one of the stock materials having a layer of adhesive provided thereon. The frame removably mounts the feed rolls. The master processing assembly performs a master processing operation wherein the master processing assembly causes adhesive bonding between a master and the stock materials. The gauge assembly has (a) a supply roll monitor operable to continuously monitor an amount of stock material remaining on the feed rolls and (b) a user readable supply level indicator operatively connected to the supply roll monitor. The supply level indicator is operable to continuously indicate to the user the amount of stock material remaining on the feed rolls as the stock materials are being unwound.

27 Claims, 16 Drawing Sheets

FOREIGN PATENT DOCUMENTS

| | | |
|---|---|---|
| JP | 2000-168020 | 6/2000 |
| JP | 2000-263644 | 9/2000 |
| JP | 2000-272005 | 10/2000 |
| JP | 2001-79940 | 3/2001 |
| JP | 2001-79942 | 3/2001 |
| JP | 2001-79943 | 3/2001 |
| JP | 2001-79946 | 3/2001 |
| JP | 2001-96617 | 4/2001 |
| JP | 2001-96619 | 4/2001 |
| JP | 2001-277357 | 10/2001 |
| JP | 2001-278517 | 10/2001 |

\* cited by examiner

GAUGE ASSEMBLY FOR A MASTER PROCESSING APPARATUS

The present application claims priority to U.S. Provisional Application of Lemens et al., Serial No. 60/304,748 filed on Jul. 13, 2001, the entirety of which is hereby incorporated into the present application by reference.

FIELD OF THE INVENTION

The present invention relates to a master processing apparatus for performing a master processing operation on a selected substrate.

BACKGROUND OF THE INVENTION

Master processing apparatuses, such as laminating apparatuses and adhesive transfer apparatuses, are well-known in the art. These apparatuses typically include a frame to which a pair of feed rolls are removably mounted (either individually or in a cartridge). A master processing assembly is provided in the frame and the stock materials on the feed roll are unwound and fed into the processing assembly. A power or hand-operated actuator actuates the processing assembly. A master (such as a photograph, printout, business card or any other selected substrate or document) to be processed is fed into the processing assembly and the processing assembly causes adhesive from one or both the stock materials to bond to the master. In laminating operations, both stock materials are laminating films coated with pressure-sensitive or heat-sensitive adhesive and these films are both adhered to the opposing sides of the master. In adhesive transfer operations, one of the stock materials is a release liner on which a layer of adhesive is coated and the other is an aggressive or non-aggressive mask. During the operation, the adhesive on the release liner is transferred to one side of the master and, if the mask substrate is aggressive (i.e. has an affinity for adhesive bonding), then any excess adhesive will transfer to the mask substrate, which is then peeled off to expose the master on the release liner and remove the excess adhesive. For further details on these operations, reference may be made to U.S. Pat. No. 5,580,417 and 5,584,962.

In any master processing apparatus, the feed rolls of stock material must periodically be replaced. However, in known apparatuses, there is no immediate indication of the amount of stock material on the feed rolls or of when the feed rolls need to be replaced. As a result, an uninformed user may perform a laminating operation, for example, without a sufficient supply of stock material on the feed roll being available to perform the operation, which may cause damage to the master. This can be especially problematic for unique documents, such as photographs, or for long masters, such as a banner or poster. Thus, it would be desirable to provide for gauging the supply of stock material on feed rolls and providing an indication to users of when the feed rolls need replacement so as to facilitate operation of the apparatus.

SUMMARY OF THE INVENTION

One aspect of the invention provides a master processing apparatus for use with a pair of removable feed rolls, the removable feed rolls carrying a supply of stock material to be unwound, at least one of the stock materials having a layer of adhesive provided thereon. The apparatus comprises a frame, a master processing assembly, and a gauge assembly. The frame is constructed and arranged to removably mount the feed rolls. The master processing assembly is constructed and arranged such that, when the feed rolls are removably mounted to the frame, a master can be inserted into the master processing assembly together with the stock materials unwound from their respective feed rolls and disposed on opposing sides of the master. The master processing assembly is constructed and arranged to perform a master processing operation wherein the master processing assembly causes adhesive bonding between the master and the stock materials being fed into the feed side thereof and subsequently discharges the processed master and stock materials outwardly from a discharge side thereof. The gauge assembly has (a) a supply roll monitor operable to continuously monitor an amount of stock material remaining on the feed rolls and (b) a user readable supply level indicator operatively connected to the supply roll monitor. The supply level indicator is operable to continuously indicate to the user the amount of stock material remaining on the feed rolls as the stock materials are being unwound.

In another aspect of the present invention, the objective may also be achieved by providing a master processing system. The system comprises a frame, first and second feed rolls, a master processing assembly, and a gauge assembly. The first and second feed rolls carry respective supplies of first and second stock material. The feed rolls are mounted to the frame to enable the stock materials to be unwound from their respective feed rolls, at least one of the stock materials having a layer of adhesive disposed thereon. The master processing assembly is constructed and arranged such that a master can be inserted into the master processing assembly together with the stock materials unwound from their respective feed rolls and disposed on opposing sides of the master. The master processing assembly is constructed and arranged to perform a master processing operation wherein the master processing assembly causes adhesive bonding between the master and the stock materials being fed into the feed side thereof and subsequently discharges the processed master and stock materials outwardly from a discharge side thereof. The gauge assembly has (a) a supply roll monitor operable to continuously monitor an amount of stock material remaining on the feed rolls and (b) a user readable supply level indicator operatively connected to the supply roll monitor. The supply level indicator is operable to continuously indicate to the user the amount of stock material remaining on the feed rolls as the stock materials are being unwound.

Other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF PREFERRED EMBODIMENTS

Figure 1:
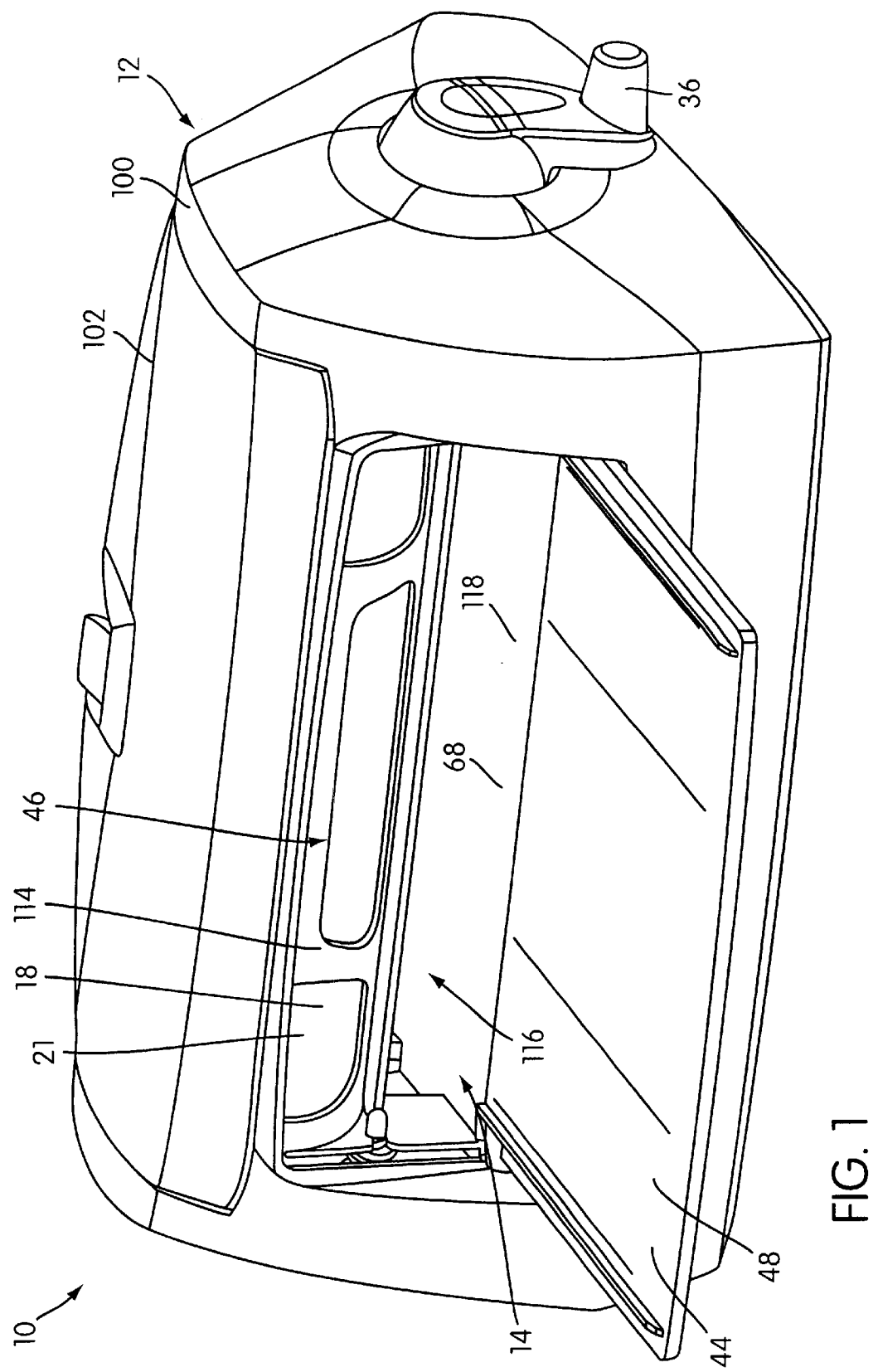
FIG. 1 is a perspective view of an embodiment of a master processing apparatus.

FIG. 1 shows one embodiment of a master processing apparatus 10. As explained below, the master processing apparatus 10 is constructed for use with a pair of removable feed rolls, each of which carries a supply of stock material that is wound around a central core. The stock materials can be, for example, a pair of transparent laminating films that are applied to opposing sides of a document, photograph or other master to be protected. The stock materials may be designed for adhesive transfer with one of the stock materials being a release liner coated with a pressure-sensitive adhesive and the other stock material being an adhesive mask substrate (see U.S. Pat. Nos. 5,580,417 and 5,584,962 and U.S. appln. of Ensign, Jr., Ser. No. 09/564,587, filed May 5, 2000). Other variations of master processing operations may be performed with the apparatus 10. For example, the stock materials may include a magnetized substrate and an aggressive or non-aggressive adhesive mask (see U.S. appln. of Neuburger, Ser. No. 09/827,943, filed Apr. 9, 2001). All the patents and patent applications mentioned hereinabove are hereby incorporated into the present application by reference. Regardless of the specific type of application, the apparatus 10 is operable to unwind the supply of stock material on each roll and apply the stock material to respective sides of the master. At least one of the stock materials has a layer of adhesive thereon which adheres the stock materials to one another and the master therebetween.

Figure 2:
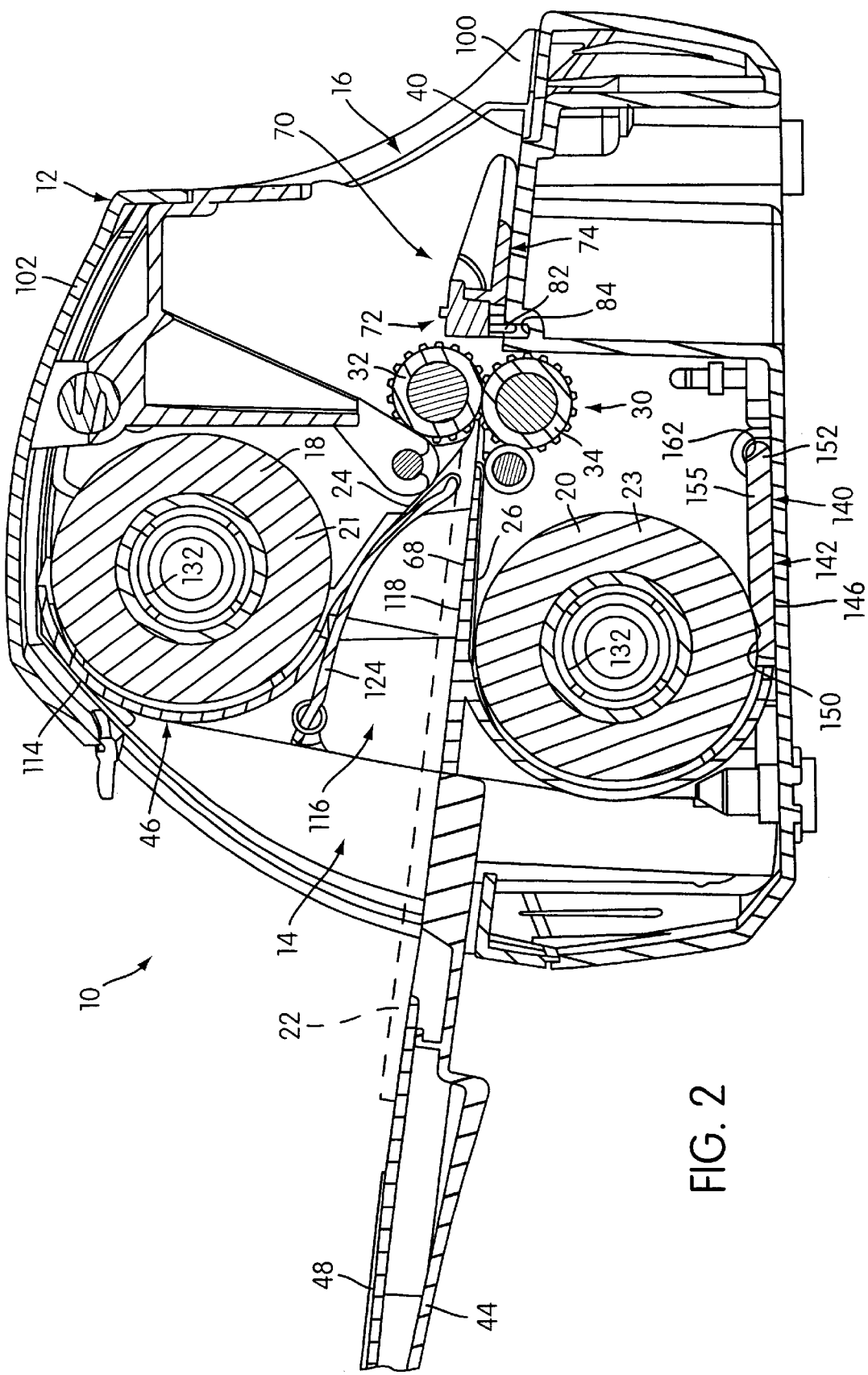
FIG. 2 is a cross-sectional view of the master processing apparatus of FIG. 1.

The structure of the master processing apparatus 10 can be best understood from FIGS. 1–2. The master processing apparatus 10 includes a frame 12 that has a feed opening 14 (see FIG. 1, for example) and an exit or discharge opening 16 (see FIG. 2, for example). The internal structure of the master processing apparatus 10 can be understood from the cross section of FIG. 2. The master processing apparatus 10 is constructed and arranged to removably mount feed rolls 18, 20. In the illustrated embodiment, the feed rolls 18, 20 are mounted in the body structure of a cartridge 46 that is removably mounted in the frame 12. However, the frame 12 may be constructed and arranged to removably mount the feed rolls individually without the use of a cartridge. Each roll 18, 20 has a supply of a wound stock material or substrate 21, 23, respectively. To better appreciate the discussion of the structure of the apparatus 10, its operation will be briefly considered first with particular reference to FIG. 2.

Generally, a master 22 (shown in dashed lines and with exaggerated thickness in FIG. 2) is inserted into the feed opening 14, and then the master 22 along with unwound portions 24, 26 of stock material 21, 23 from the upper and lower rolls 18, 20, respectively, are passed through a master processing assembly 30. The master processing assembly 30 includes a pair of cooperating pressure applying structures in the form of first and second nip rollers 32, 34, respectively.

The nip rollers 32, 34 are rotatably mounted within the frame 12. In the illustrated embodiment, an actuator, which may be in the form of a crank handle 36 as shown in FIG. 1, is operatively connected with the nip rollers 32, 34 to affect operation thereof. Alternatively, the actuator may be power-driven by a motor. It is also contemplated that an actuator may not be provided and the master 22 instead is inserted and pulled through the master processing assembly 30 manually. The master 22 is inserted into the master processing assembly 30 together with the stock materials 21, 23 unwound from their respective feed rolls 18, 20 and disposed on opposing sides of the master 22. At least one of the stock materials is covered with a layer of a pressure-sensitive adhesive. As the master 22 and the two layers of unwound stock material 21, 23 pass between the nip rollers 32, 34, the nip rollers perform a master processing operation. The nip rollers 32, 34 apply pressure to the stock materials (and to the master 22 when it is between the nip rollers 32, 34) during the master processing operation which causes adhesive bonding of each adhesive layer provided by the stock materials which bonds the master 22 and the stock materials 24, 26 to form a final product of the master 22 and the stock materials 24, 26. The final product is discharged out the discharge opening 16 by the driving action of the nip rollers 32, 34. The final product is supported at the discharge opening 16 by a substrate supporting surface 40. The substrate supporting surface 40 is configured to receive and support the processed master and stock materials discharged from the processing assembly in a substantially flat condition.

A feed tray 44 having a substrate supporting surface 48 is movably mounted to the frame 12 on the feed side of the master processing assembly 30. Preferably, the tray 44 and the frame 12 are molded plastic structures, although any suitable construction can be used.

Generally, the tray 44 is mounted on the frame 12 for selective movement between (a) an operative position (as shown in FIGS. 1–2) and (b) an inoperative position. When the tray 44 is in its operative position, it extends outwardly from the master processing assembly 30 and the substrate supporting surface 48 on the tray 44 is positioned to support a master 22 in a substantially flat condition as the master 22 is being fed into the master processing assembly 30. When the tray 44 is in its inoperative position, it is positioned in covering relation to the feed opening 14 of the frame 12 to inhibit ingress of undesired objects into the master processing assembly 30 via the feed opening 14. The movable mounting of the tray 44 into the inoperative position is also advantageous because it allows the apparatus 10 to be stored (in a package for shipping prior to sale or at a worksite after sale, for example) in less space.

A cutting assembly 70 is disposed on the discharge side 16 of the master processing assembly 30 and is operable to sever a final product containing a master 22 from the continuous strips of stock material. The cutting assembly 70 includes a blade assembly 72 and a guide member 74. The blade assembly 72 includes a blade 82. The blade 82 of the blade assembly 72 is mounted on the guide member 74 for guided transverse cutting movement therealong. Specifically, the blade 82 is mounted to the blade carriage 80 and the blade carriage 80 is slidably mounted on the guide member 74.

The guide member 74 is movably mounted to the frame 12 for selective manual movement between (a) an inoperative position in which the blade 82 is spaced above the substrate supporting surface 40 to prevent the blade from cutting through the processed master 22 and stock materials 21, 23 in the event of accidental lateral movement thereof and (b) an operative position in which a portion of the blade 82 extends downwardly below the substrate supporting surface 40 (and into a laterally extending blade receiving slot 84 formed in the surface 40 of the frame 12) so that the downward extent of the blade portion 82 of the blade assembly 72 enables the blade 82 to cut through an entire thickness of the processed master and stock materials 38 during transverse cutting movement of the blade assembly 72 with respect to the guide member 74.

In the illustrated embodiment, the frame 12 includes first and second frame portions 100, 102, which are movably connected for movement relative to one another between closed, as shown in FIGS. 1–2, and open positions. When the second frame portion 102 is in its open position, this allows an old cartridge 46 to be removed when its supply of stock materials is used up and a new cartridge having a fresh supply of stock materials to be placed in the apparatus 10. After a new supply of stock materials is placed in the apparatus 10, the end portions of the stock materials 21, 23 on a respective feed rolls 18, 20 are pulled out from the rolls and positioned between the nip rollers 32, 34. The two frame portions 100, 102 are then moved back into their closed positions.

In the illustrated embodiment, the replaceable feed rolls 18, 20 are mounted within a cartridge to facilitate easy removal and replacement of the feed rolls 18, 20. The cartridge 46 includes a cartridge body structure 114, preferably made of a suitable molded plastic, constructed and arranged to be removably mounted to the apparatus frame 12 and a pair of feed rolls 18, 20 rotatably mounted therein. The feed rolls 18, 20, each carrying a supply of the stock materials 21, 23, are mounted to the cartridge body structure 114 to enable the stock materials 21, 23 to be unwound from their respective feed rolls and placed between the nip rollers 32, 34. Each roll of stock material (or substrate) 18, 20 is comprised of a long, continuous strip of stock material wound around a central tubular core 132. Typically the core 132 is made of heavy cardboard. The core 132 is rotatably mounted in the cartridge body structure 114. The cartridge body structure 114 and the feed rolls 18, 20 are constructed and arranged such that, when the cartridge body structure 114 is removably mounted to the apparatus frame 12, a master 22 can be inserted into a front opening 116 of the cartridge 46 and pass therethrough into the master processing assembly 30 of the apparatus 10 with the first and second stock materials 21, 23 from the respective feed rolls 18, 20 and disposed on opposing sides of the master 22.

The cartridge 46 includes a substrate supporting member 118, which extends between opposing sidewalls of the cartridge 46. The upper surface of the supporting member 118 provides a generally planar substrate supporting surface 68. The substrate supporting surface 68 is generally co-planar with and immediately adjacent to the substrate supporting surface 48 of the feed tray 44 so that together these surfaces 48, 68 continuously support the master from the feed tray 44 to the master processing assembly 30.

The cartridge 46 also includes a master engaging structure 124. The master engaging structure 124 applies a frictional resistance to the advancement of the master 22 in a feeding direction to thereby tension the master to prevent the same from wrinkling, for example, as it goes into the master processing assembly 30. The master engaging structure may also provide the additional, but not necessary, benefit of wiping any particles off the surface of the master 22.

In a broad sense, the cartridge 46 serves to removably mount the feed roll 18, 20 to the apparatus frame 12. Thus, the cartridge 46 may be referred to as a feed roll mounting structure, which is intended to encompass any structural arrangement suitable for mounting and supporting one or more feed rolls on an apparatus frame.

In the illustrated embodiment, to perform a master processing operation, a cartridge 46 is placed inside the frame 12 and the leading portions 24, 26 of the stock materials 21, 23 from the upper and lower feed rolls 18, 20, respectively, are unwound and placed between the nip roller 32, 34.

A document or other master 22 to be covered with stock material is placed on the substrate support surface 48 of the feed tray 44 and pushed through the feed opening 14 in the frame 12 and through the cartridge front opening 116 in the replaceable cartridge 46 until the document 22 comes into contact with the unwound portions 24, 26 of the stock materials 21, 23. At least one of the unwound portions 24, 26 is coated with an adhesive so that the document adheres thereto. The operator then rotates the crank handle 36 which causes the nip rollers 32, 34 of the master processing assembly 30 to rotate so as to drive the master 22 and the stock materials therebetween and outwardly towards the discharge opening 16 in the frame 12. As the stock materials (with or without the master 22 therebetween) pass between the nip rollers 32, 34, the nip rollers apply pressure to the stock materials to activate the pressure sensitive adhesive and adhere the stock materials to opposing sides of the master 22 and/or to one another.

When the entire length of the master 22 has been covered with stock material 21, 23, the final product passes through the discharge opening 16. When the master has cleared the discharge opening 16, the operator stops rotation of the crank handle 36 and uses the blade 82 of the cutting assembly 70 to sever the finished product 38 from the continuous strip of stock materials 21,23.

In an alternative embodiment for laminating apparatuses, the stock materials may be coated with a heat-activated adhesive. In such an apparatus, heating elements would be provided in the master processing assembly 30 upstream of the nip rollers (or other pressure applying structures) to soften or melt the adhesive prior to application of pressure by the nip rollers. For example, a pair of heating platens could be positioned on opposing sides of the stock materials in order to heat the adhesive prior to reaching the nip rollers. Alternatively, heating elements could be provided in the nip rollers themselves so as to simultaneously heat and apply pressure to the stock materials. The master processing assembly used in an apparatus constructed in accordance with this invention may have any suitable construction.

A further understanding of the details of operation and of the components of the master processing apparatus 10 is not necessary in order to understand the principles of the present invention and thus will not be further detailed herein. Further details of operation and of the components of the master processing apparatus 10 are disclosed in U.S. patent application of Lemens et al., Ser. No. 09/987,484, the entirety of which is hereby incorporated by reference into the present specification. Instead, the present invention is concerned in detail with a gauge assembly 140 of the master processing apparatus 10 and how it provides a continuous indication of the amount of stock material 21, 23 remaining on the feed rolls 18, 20 as the stock materials 21, 23 are being unwound.

The gauge assembly 140 includes a supply roll monitor 142 and a user readable supply level indicator 144 operatively connected to the supply roll monitor 142, as shown in FIGS. 3–7. The supply roll monitor 142 is operable to continuously monitor an amount of stock material 21, 23 remaining on the feed rolls 18, 20. The supply level indicator 144 is operable to continuously indicate to the user the amount of stock material 21, 23 remaining on the feed rolls 18, 20 as the stock materials 21, 23 are being unwound.

Figure 8:
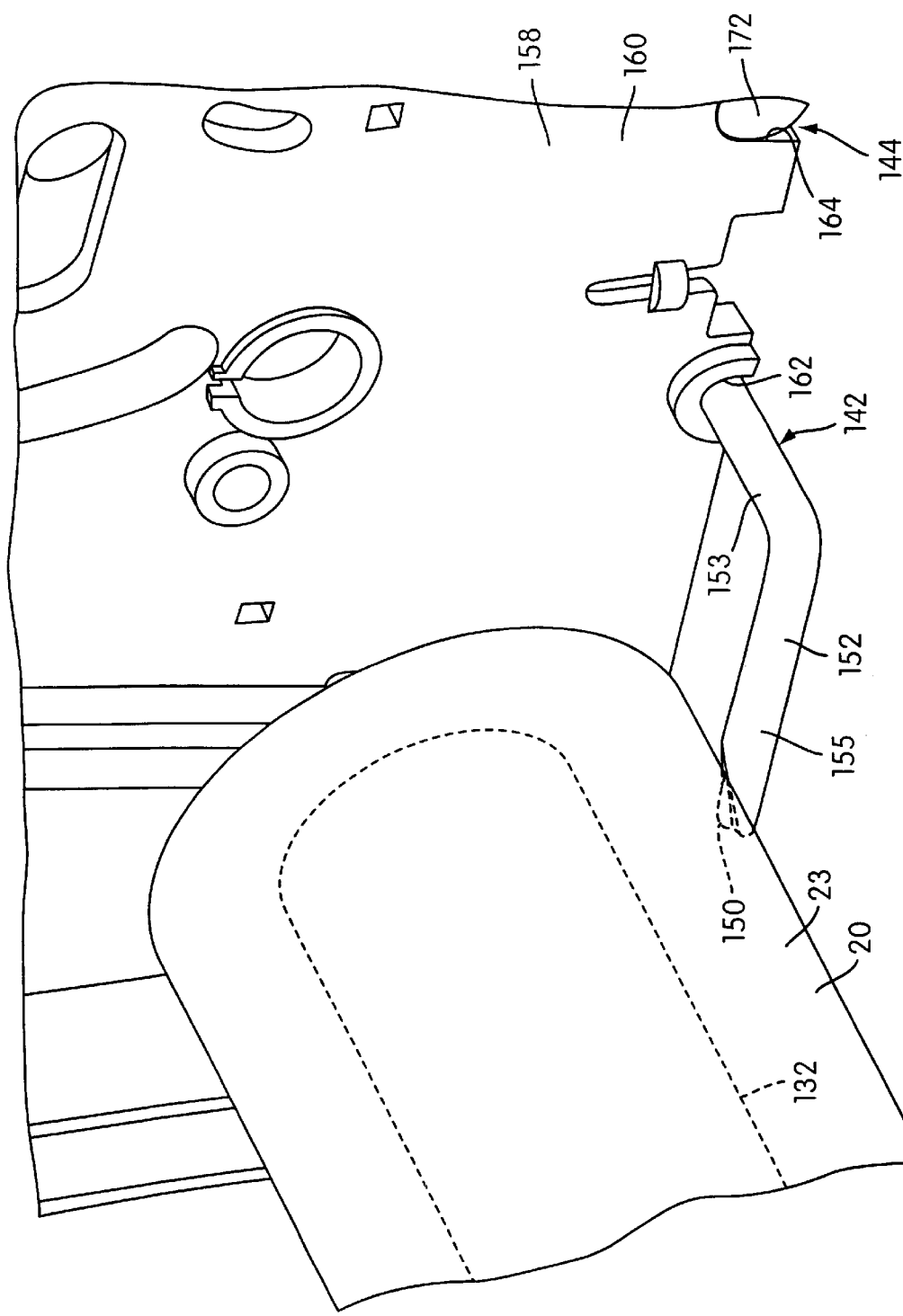
FIG. 8 is a close-up perspective view of a supply roll monitor of the gauge assembly of FIG. 3 operatively engaged with the stock material of a feed roll.

In the illustrated embodiment, the supply roll monitor 142 comprises a cam element 146 rotatably mounted to the frame 12. The cam element 146 provides a cam surface 148 at one end thereof and a stock material engaging surface 150 at an other end thereof. Specifically, the cam element 146 has an L-shaped arm portion 152 (as shown in FIG. 8) and a cam portion 154. The cam portion 154 provides the cam surface 148 and the arm portion 152 provides the stock material engaging surface 150. The arm portion 152 and the cam portion 154 may be integrally formed of the same material or may be formed separately and fixedly mounted together in any known manner.

Figure 6:
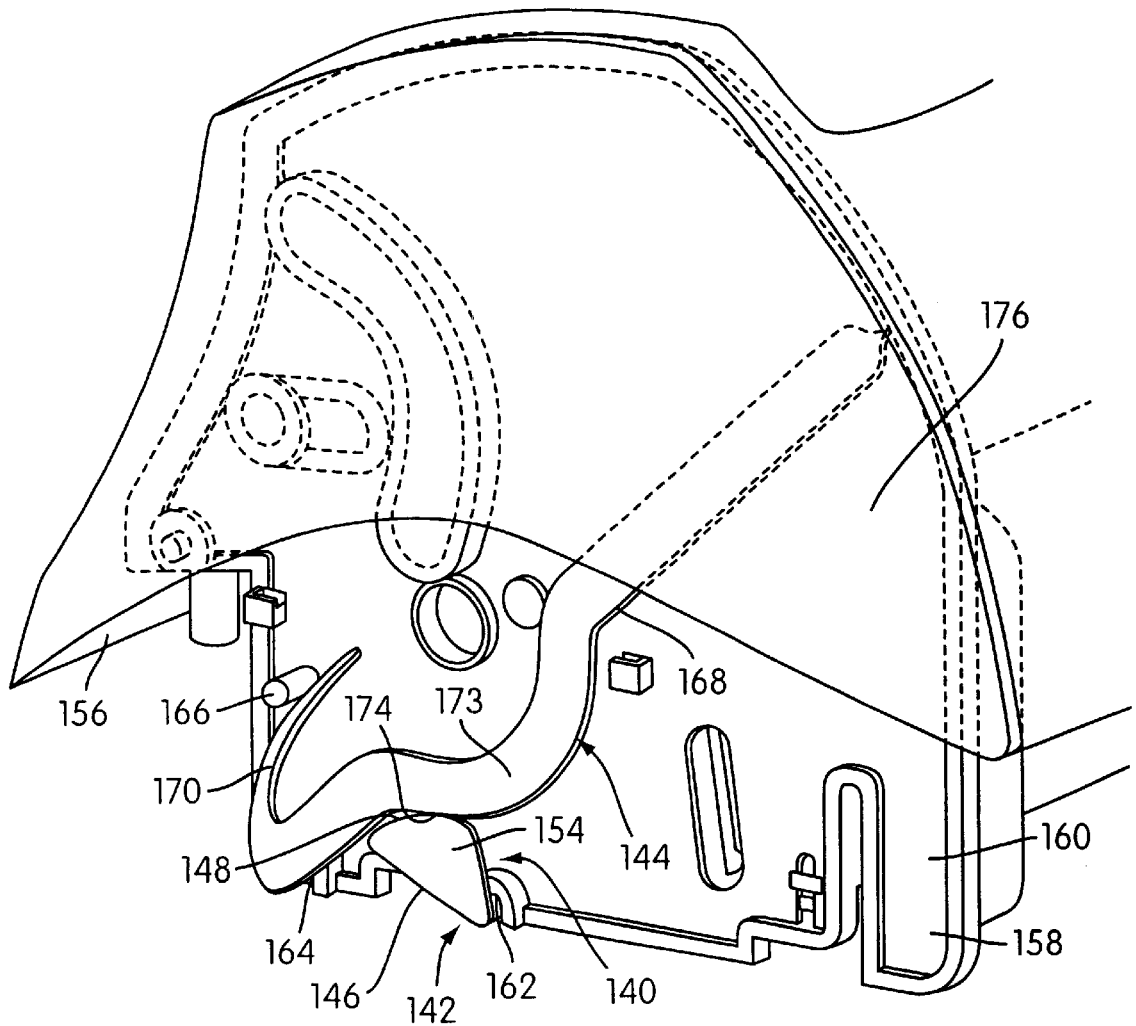
FIG. 6 is a perspective view illustrating the gauge assembly of FIG. 3 indicating a substantially empty amount of stock material remaining on a feed roll of the master processing apparatus.
Figure 7:
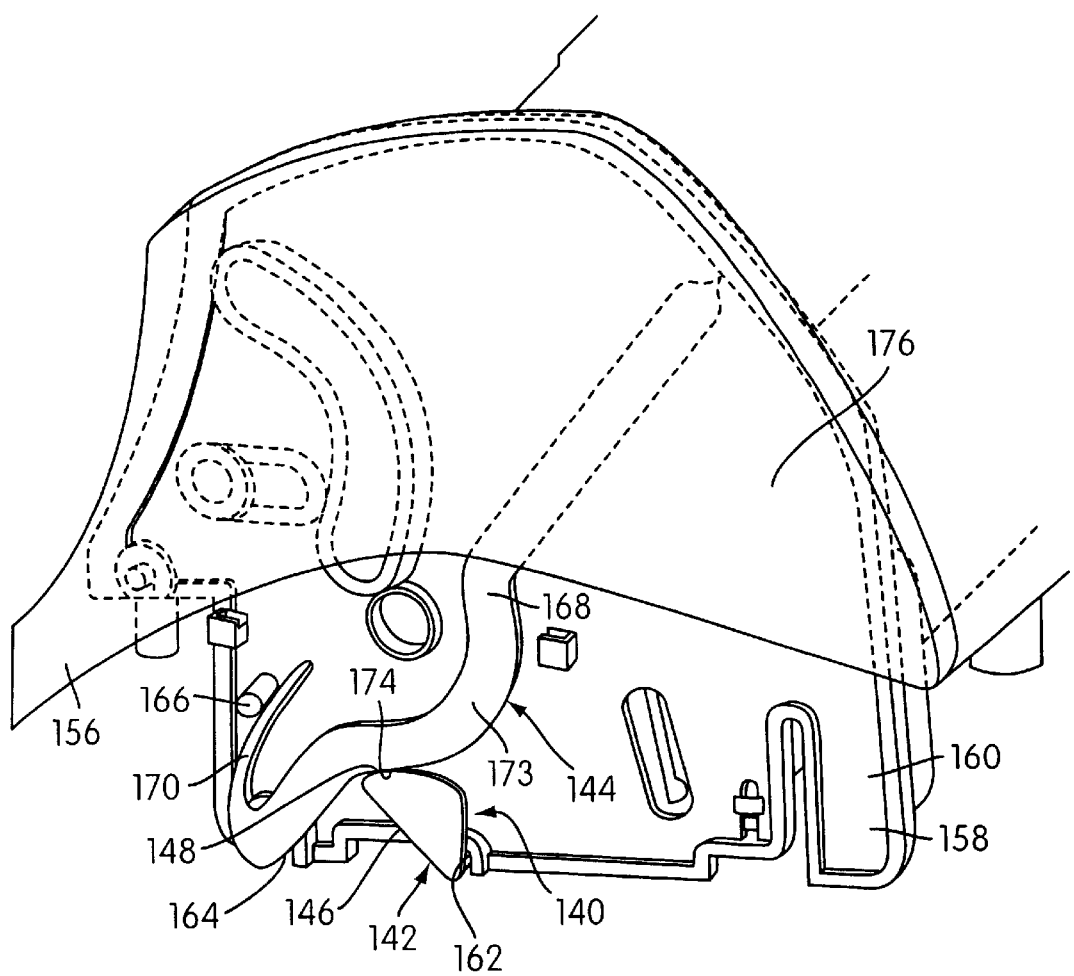
FIG. 7 is a perspective view illustrating the gauge assembly of FIG. 3 indicating a substantially full amount of stock material remaining on a feed roll of the master processing apparatus.

Referring more particularly to FIGS. 6–8, the frame 12 comprises an outer decorative shell 156 (only a portion illustrated) and an internal sub-frame 158 (only a portion illustrated). The sub-frame 158 is constructed and arranged to removably mount the cartridge 46 (or the feed rolls 18, 20 individually) and the associated components of the master processing assembly 30. The sub-frame 158 includes a pair of opposing side walls, only the side wall 160 being illustrated. The side wall 160 has a cam element receiving opening 162 and an indicator receiving opening 164 at the lower edge thereof. The side wall 160 further includes an anchoring structure 166 formed thereon.

The cam element 146 is rotatably mounted to the frame 12 such that a short leg 153 of the L-shaped arm portion 152 extends through the cam element receiving opening 162 and the cam portion 154 is positioned adjacent the outwardly facing surface of the side wall 160. The stock material engaging surface 150 provided on a long leg 155 of the L-shaped arm portion 152 is positioned into engagement with the stock material 23 of the feed roll 20, as more clearly shown in FIGS. 4, 5, and 8. The stock material engaging surface 150 is rounded so as to conform with the rounded outer surface of the stock material 23, but any suitable configuration may be used. As a result, a sufficient surface area defined by the stock material engaging surface 150 is engaged with the stock material 23. It should be noted that the gauge assembly 140 may be mounted on either of the pair of opposing side walls.

In the illustrated embodiment, the supply level indicator 144 comprises a pointing arm 168 and a biasing arm 170 connected to the pointing arm 168, as shown in FIGS. 3–7. Preferably, the biasing arm 170 and the pointing arm 168 are integrally formed of an elastically deformable material, although any suitable construction can be used.

The supply level indicator 144 further comprises a cylindrical mounting element 172. The pointing arm 168 and the biasing arm 170 extend radially outwardly from the mounting element 172 and are spaced apart from one another by a predetermined amount. The supply level indicator 144 is mounted to the frame 12 such that the mounting element 172 is received within the indicator receiving opening 164 and the biasing arm 170 is engaged with the anchoring structure 166. The pointing arm 168 has a U-shaped portion 173 providing a cam engaging surface 174 that is configured and positioned to engage the cam surface 148 of the cam element 146 when the supply level indicator 144 is mounted to the frame 12.

The biasing arm 170 is configured and positioned to bias the pointing arm 168 and hence the side surface 174 in a first direction into continuous engagement with the cam surface 148 of the cam element 146 so as to bias the stock material engaging surface 150 of the cam element 146 into continuous engagement with the stock material 23 of the feed roll 20.

Specifically, the pointing arm 168 and the cam element 146 are configured and positioned such that, as the feed roll 20 is unwound during the master processing operation, the pointing arm 168 moves in the first direction relative to the frame 12 to move the cam surface 148 of the cam element 146 engaged therewith. As a result, the stock material engaging surface 150 of the cam element 146 moves to remain in the continuous engagement with the stock material 23 of the feed roll 20. The movement of the pointing arm 168 relative to the frame 12 in the first direction provides the continuous indication of the amount of stock material 21, 23 remaining on the feed rolls 18, 20. It should be noted that because the feed rolls 18, 20 provide a substantially equal supply of stock material 21, 23 with respect to one another, monitoring the supply of stock material of the one feed roll 20 will provide a continuous indication of the supply of both feed rolls 18, 20. However, the present invention is intended to encompass an arrangement where the supply of both feed rolls 18, 20 are monitored.

The biasing arm 170 is self-biased outwardly from the pointing arm 168 in a free state. When the supply level indicator 144 is mounted to the frame 12, the biasing arm 170 and the pointing arm 168 are deflected inwardly towards one another due to their positioning between the anchoring structure 166 and the cam element 146. As a result, the side surface 174 of the pointing arm 168 is biased into continuous engagement with the cam surface 148 of the cam element 146.

During movement of the pointing arm 168 in the first direction, the side surface 174 and the cam surface 148 slide past one another so that the cam element 146 is pivoted about the short leg 153 of the L-shaped portion to move the stock material engaging surface 150 into engagement with the stock material 23.

Figure 3:
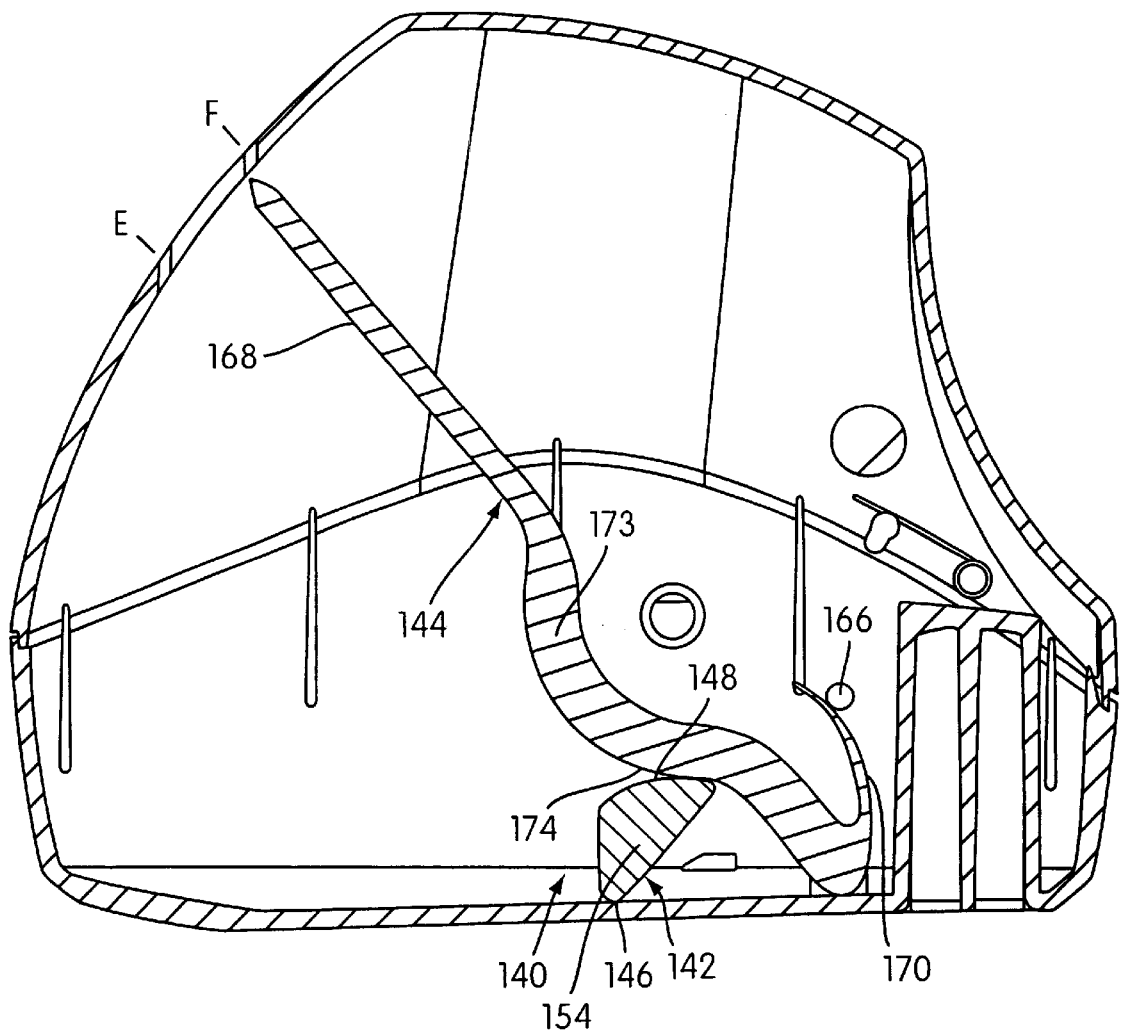
FIG. 3 is a cross-sectional view of the master processing apparatus of FIG. 1 illustrating an embodiment of a gauge assembly constructed according to the principles of the present invention.
Figure 4:
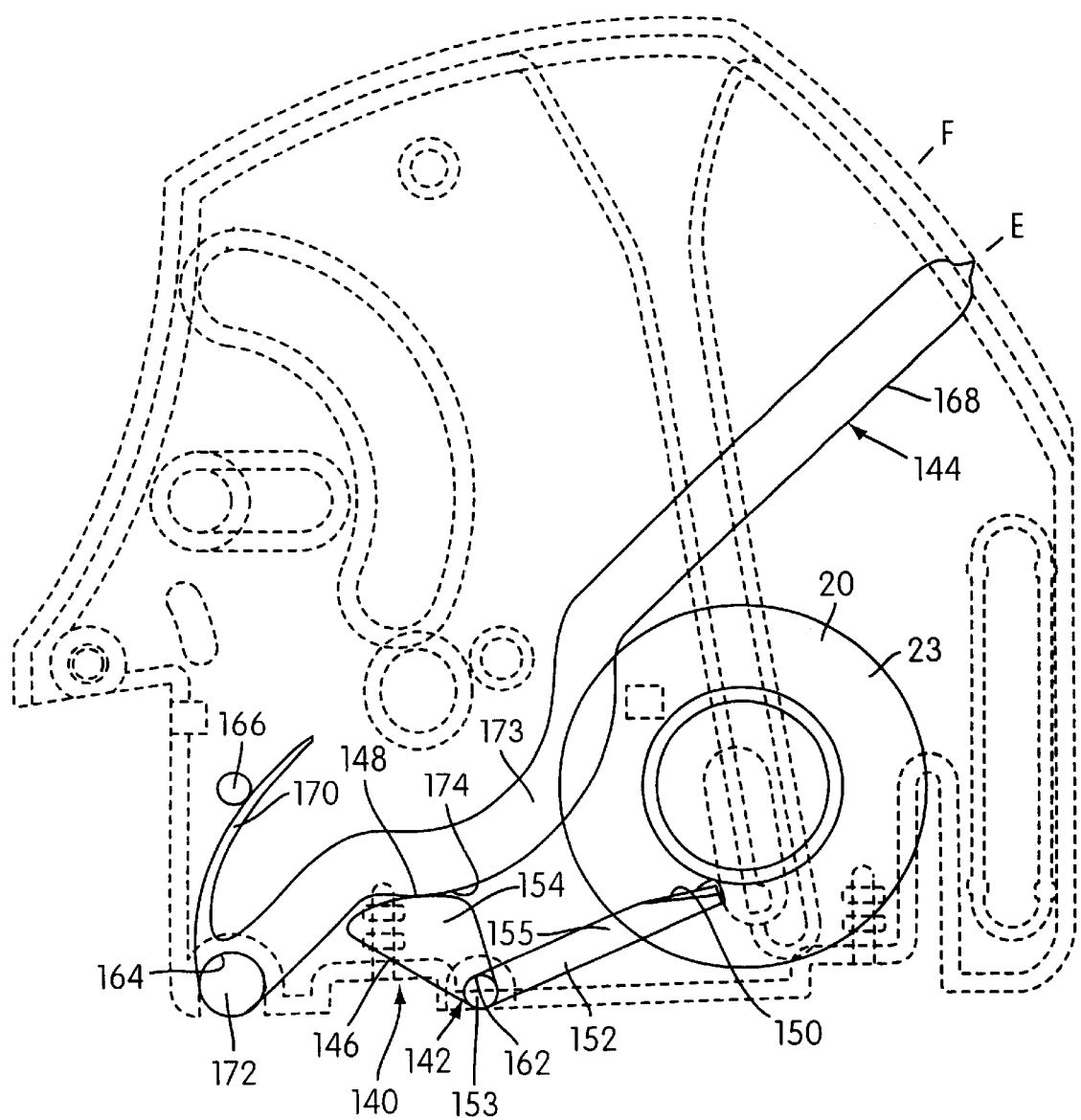
FIG. 4 is a cross-sectional view illustrating the gauge assembly of FIG. 3 indicating a substantially empty amount of stock material remaining on a feed roll of the master processing apparatus.
Figure 5:
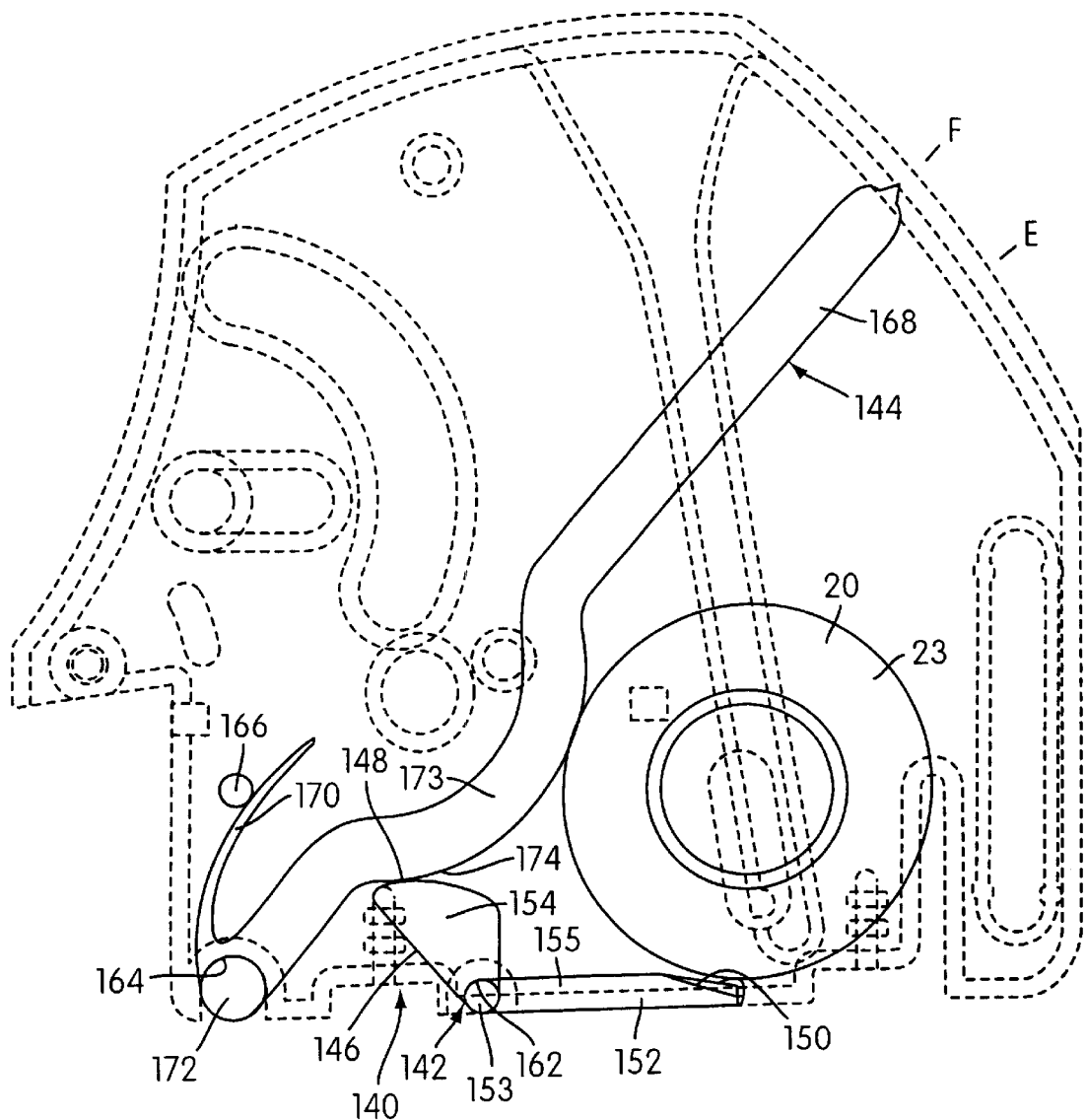
FIG. 5 is a cross-sectional view illustrating the gauge assembly of FIG. 3 indicating a substantially full amount of stock material remaining on a feed roll of the master processing apparatus.

In the illustrated embodiment, the pointing arm 168 is enclosed within the outer decorative shell 156 of the frame 12, as shown in FIGS. 6–7. The outer decorative shell 156 includes a transparent portion 176 positioned such that the pointing arm 168 is visible through the transparent portion 176. As a result, the user can observe the movement of the pointing arm 168 relative to the frame 12 to determine the amount of stock material 21, 23 remaining. The transparent portion 176 may include measurement indicia thereon. The pointing arm 168 would move relative to the transparent portion 176 and hence the measurement indicia thereon during the master processing operation to provide the indication of the amount of stock material 21, 23 remaining on the feed rolls 18, 20. In the illustrated embodiment, the measurement indicia are in the form of Empty (E) and Full (F) markings. Thus, the user can determine if the feed rolls 18, 20 are substantially full (as shown in FIGS. 3, 5, and 7), half full, substantially empty (as shown in FIGS. 4 and 6), or anywhere between in relation to these markings E, F. The measurement indicia may also be in the form of a range of numerals.

The outer decorative shell 156 need not have a transparent portion and the shell 156 could instead include an opening with a portion of the pointing arm 168 extending through the opening and visible to the user. The shell 156 of the frame 12 would include measurement indicia thereon, the pointing arm 168 moving relative to the shell 156 and hence the measurement indicia thereon during the master processing operation to provide the indication of the amount of stock material 21, 23 remaining on the feed rolls 18, 20.

The supply roll monitor 142 and the supply level indicator 144 may alternatively be mounted to the body structure of the cartridge 46 instead of to the apparatus 10. The outer decorative shell 156 would include a transparent portion or an opening positioned such that the pointing arm 168 would be visible therethrough.

As another alternative within the scope of the invention, the gauge assembly 140 may be associated with an electronic system that could provide a visual indication, such as an LED display, of the amount of stock material 21, 23 remaining on the feed rolls 18, 20. The electronic system could also provide an audio signal, such as a beep, to indicate to the user that the feed rolls 18, 20 were at or near empty. The audio signal may accompany the visual indication, or may be provided in lieu thereof.

The pointing arm 168 and cam surface 148 may be configured and positioned with respect to one another such that the gauge assembly 140 could be utilized for different lengths of feed rolls 18, 20. For example, new 25' and 50' feed rolls mounted within the apparatus 10 would both indicate substantially full by the gauge assembly 140. When unwound, the gauge assembly 140 could still provide an accurate indication of the amount of stock material remaining on the feed rolls. In the instance where feed rolls of varying lengths may be used, the measurement indicia may be changed to indicate the length of supply material left in feet or meters, instead of using a full to empty type indication, as a 50' roll will be "more full" than a 25' roll. However, this need not be done, it is possible to use full to empty type indication in this situation.

Further, the cartridge 46 may be configured to mount and support feed rolls having different widths. For example, the cartridge 46 may be configured to mount feed rolls having a standard letter size paper width or the cartridge 46 may be configured to mount feed rolls having a width that is smaller or larger than standard letter size paper. The frame 12 of the apparatus 10 is configured such that the cartridge 46 and hence the feed rolls are aligned to one side of the frame 12 when mounted therein. In order to accommodate different width cartridges having different width feed rolls, the gauge assembly 140 is mounted to the same side of the frame 12 in which the cartridge 46 is aligned to. Thus, if the cartridge 46 is aligned to the left side of the frame 12, the gauge assembly 140 is mounted on the left side of the frame 12. As a result, the stock material engaging surface 150 of the cam element 146 can remain in the continuous engagement with the stock material of the feed roll, regardless of the width of the feed roll.

A further embodiment of the gauge assembly, indicated as 240, is illustrated in FIGS. 9–16. FIGS. 9–12 show the gauge assembly 240 installed to the frame 12 of the master processing apparatus 10 to provide a continuous indication of the amount of stock material 21, 23 remaining on the feed rolls 18, 20 as the stock materials 21, 23 are being unwound. In this embodiment, the supply roll monitor 242 and the supply level indicator 244 are rigidly connected to one another, as will be discussed below. In the previous embodiment, the supply roll monitor 142 and the supply roll indicator 144 were not rigidly connected, but biased into continuous engagement with one another.

Figure 9:
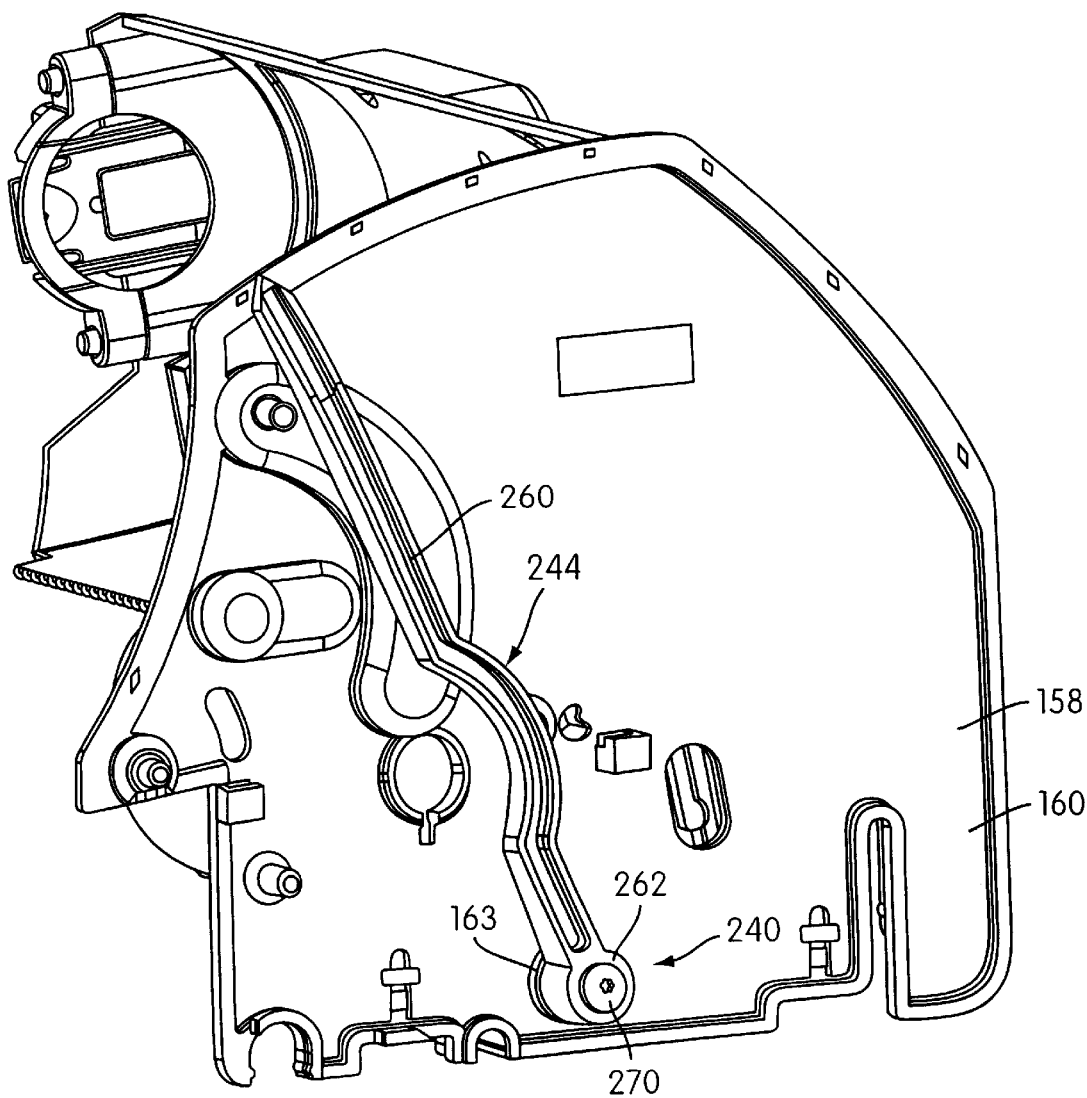
FIG. 9 is a perspective view illustrating another embodiment of the gauge assembly, the gauge assembly indicating a substantially empty amount of stock material remaining on a feed roll of the master processing apparatus.
Figure 10:
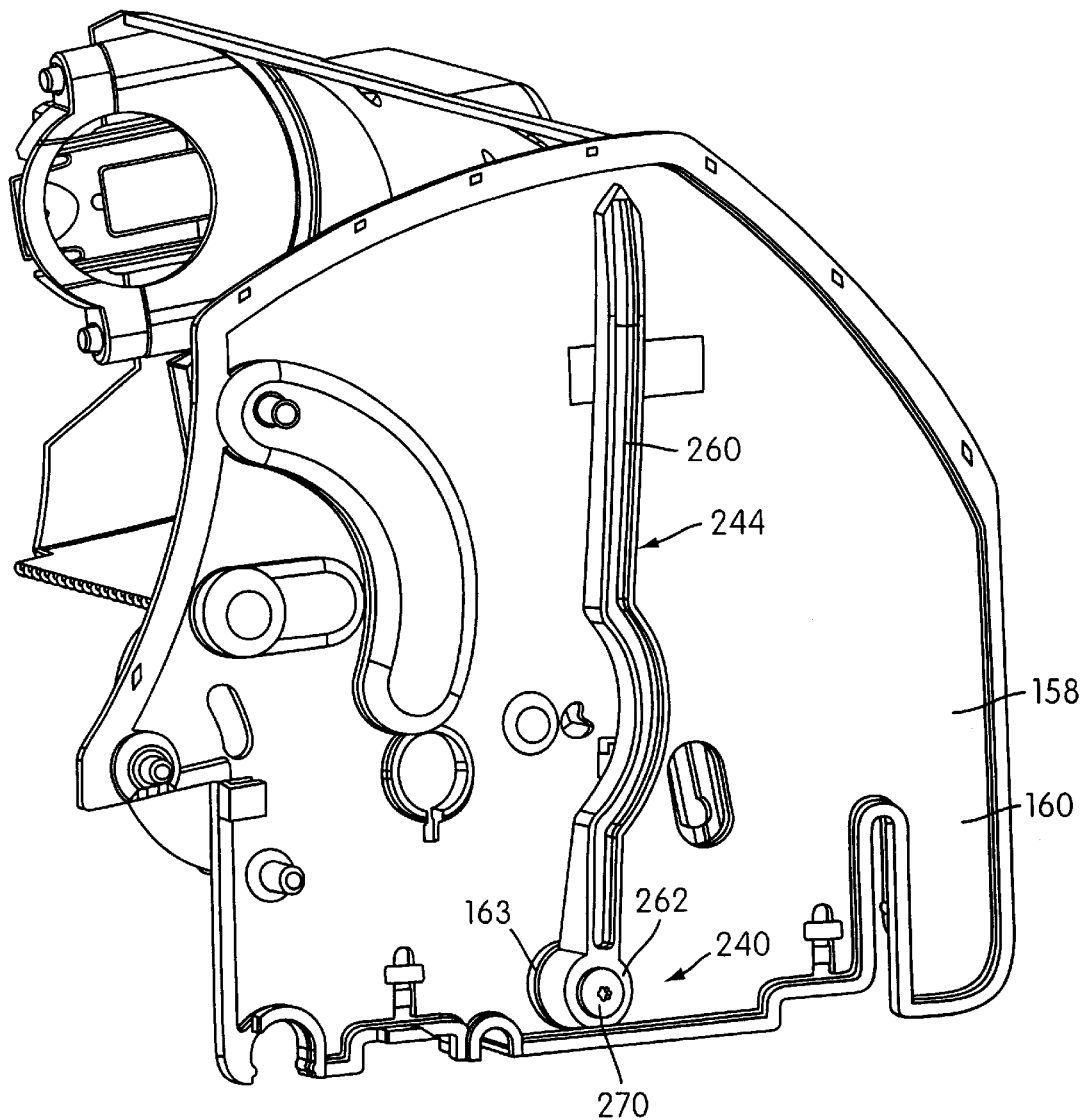
FIG. 10 is a perspective view illustrating the gauge assembly of FIG. 9 indicating a substantially full amount of stock material remaining on a feed roll of the master processing apparatus.

Similar to the previous embodiment, the supply roll monitor 242 is operable to continuously monitor an amount of stock material 21, 23 remaining on the feed rolls 18, 20 (see FIGS. 11 and 12) and the supply level indicator 244 is operable to continuously indicate to the user the amount of stock material 21, 23 remaining on the feed rolls 18, 20 as the stock materials 21, 23 are being unwound (see FIGS. 9 and 10).

Figure 13:
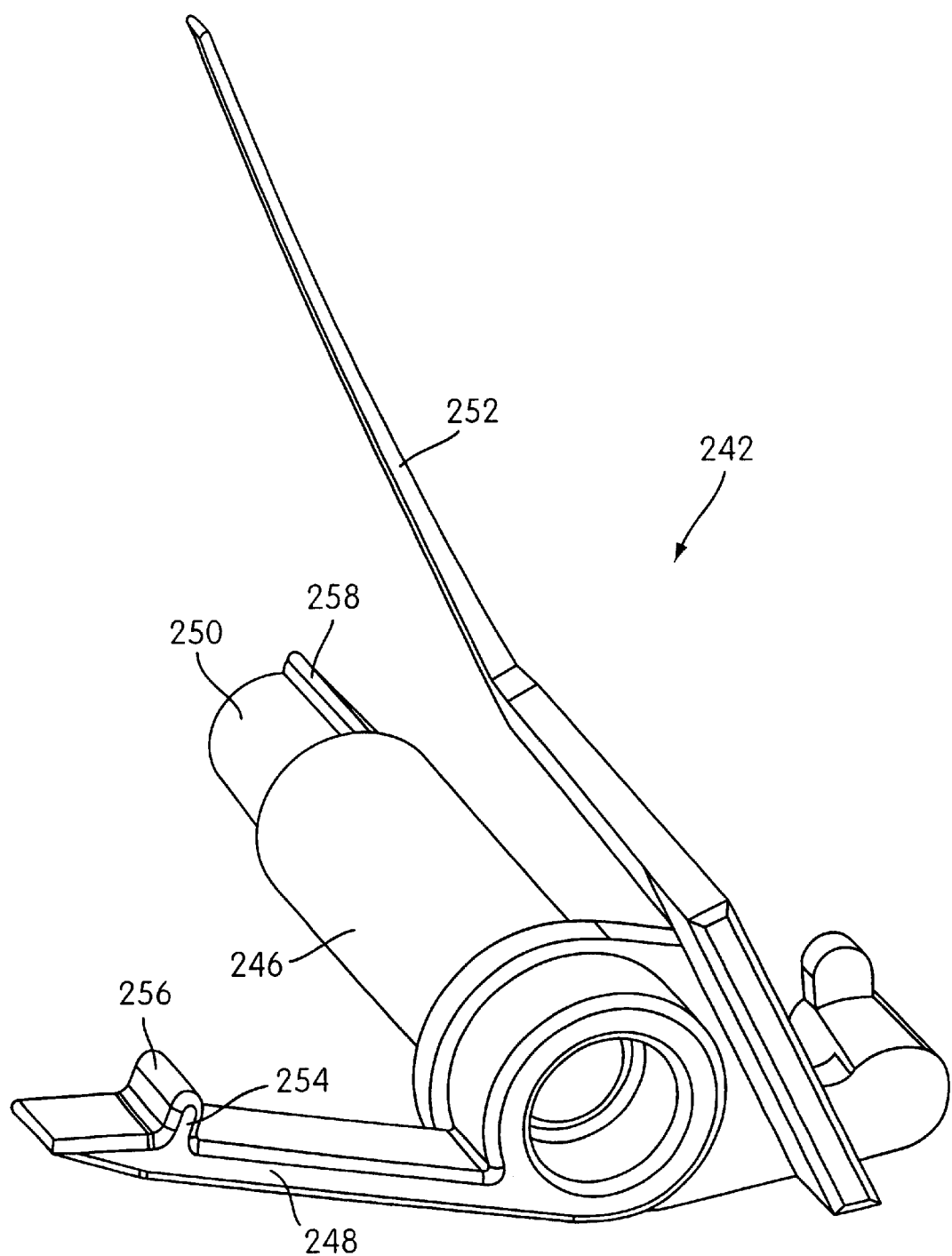
FIG. 13 is a perspective view illustrating a supply roll monitor of the gauge assembly of FIG. 9.

The supply roll monitor 242 is rotatably mounted to the frame 12 and includes a spindle portion 246, a stock material engaging portion 248, an indicator mounting portion 250, and a biasing portion 252, as shown in FIG. 13. The spindle portion 246 has a generally cylindrical cross-sectional configuration and defines the rotational axis of the supply roll monitor 242. The stock material engaging portion 248 extends radially outwardly from one end of the spindle portion 246. The stock material engaging portion 248 includes a protrusion 254 that provides a stock material engaging surface 256. The indicator mounting portion 250 extends axially outwardly from the other end of the spindle portion 246 and has a smaller cross sectional dimension than the spindle portion 246. The indicator mounting portion 250 has an elongated protrusion 258 that is configured to be received within a slot provided in the supply roll indicator 244, as will be further discussed. The biasing portion 252 is in the form of an elongated resilient arm member that is configured to bias the stock material engaging surface 256 into continuous engagement with the stock material 23 of the feed roll 20. The portions 246, 248, 250, 252 of the supply roll monitor 242 may be integrally formed of the same material or may be formed separately and fixedly mounted together in any known manner.

Figure 14:
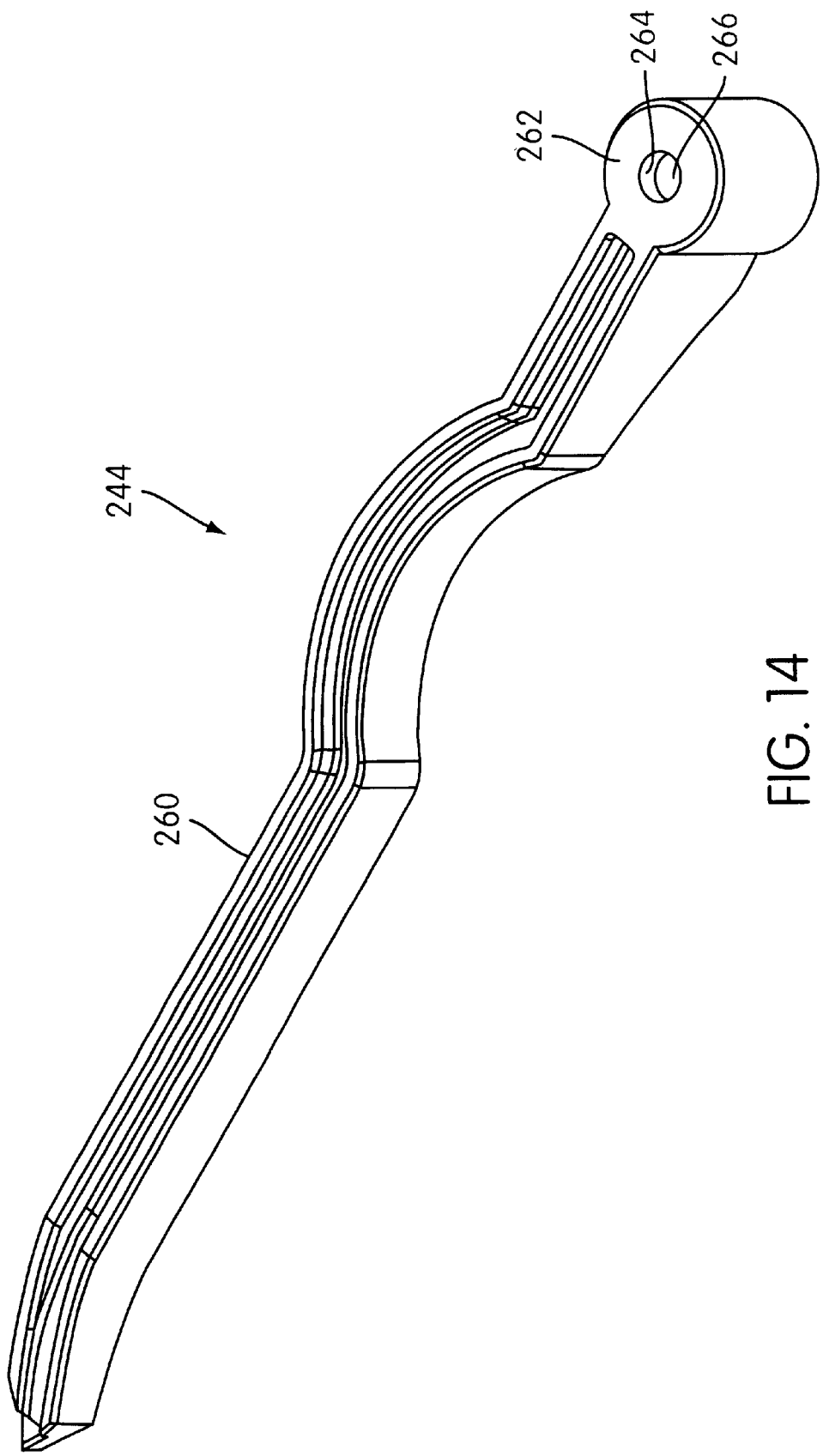
FIG. 14 is a top perspective view illustrating a supply level indicator of the gauge assembly of FIG. 9.
Figure 15:
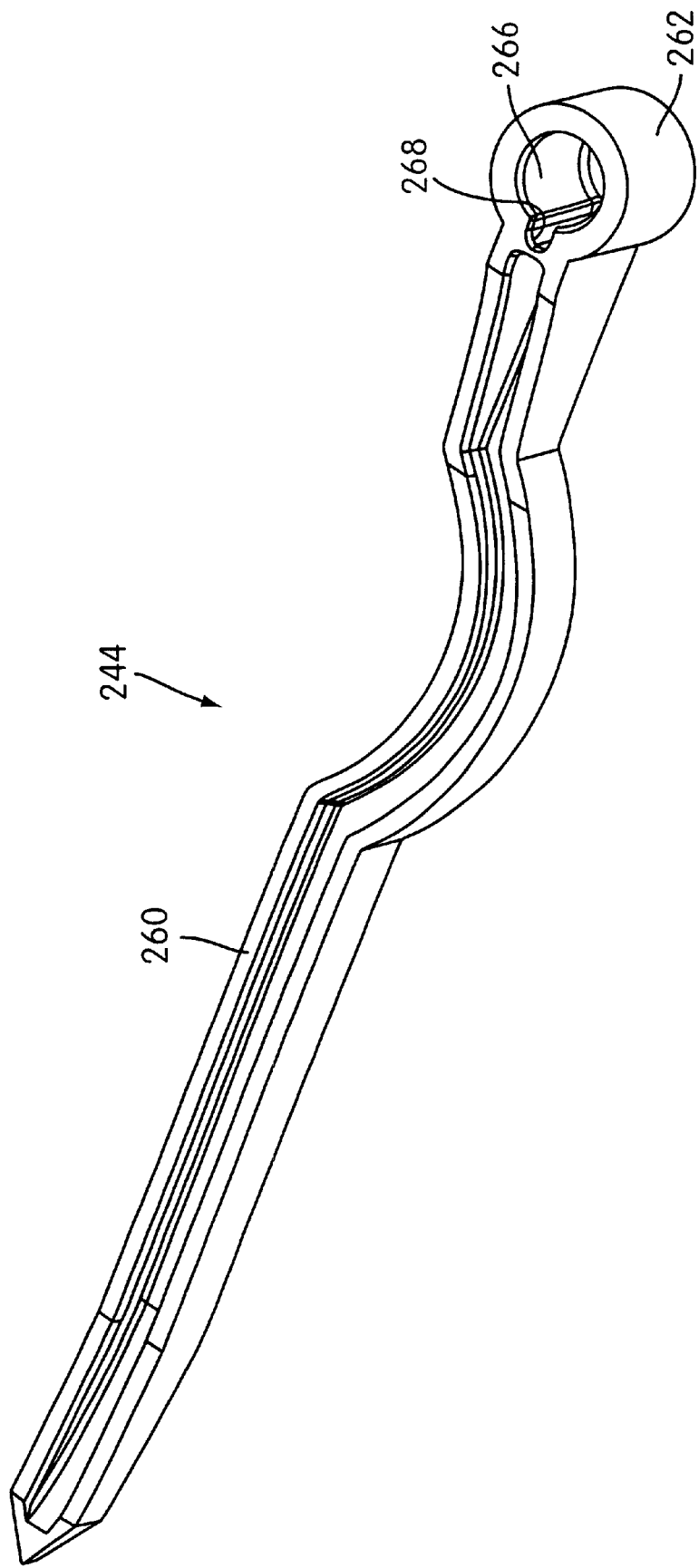
FIG. 15 is a bottom perspective view illustrating a supply level indicator of the gauge assembly of FIG. 9.

As shown in FIGS. 14 and 15, the supply level indicator 244 comprises a pointing arm 260 that provides a monitor mounting portion 262 at one end thereof. The monitor mounting portion 262 has a fastener receiving opening 264 that leads to a generally cylindrical monitor mounting opening 266. A slot 268 extends radially outwardly from the opening 266.

Figure 16:
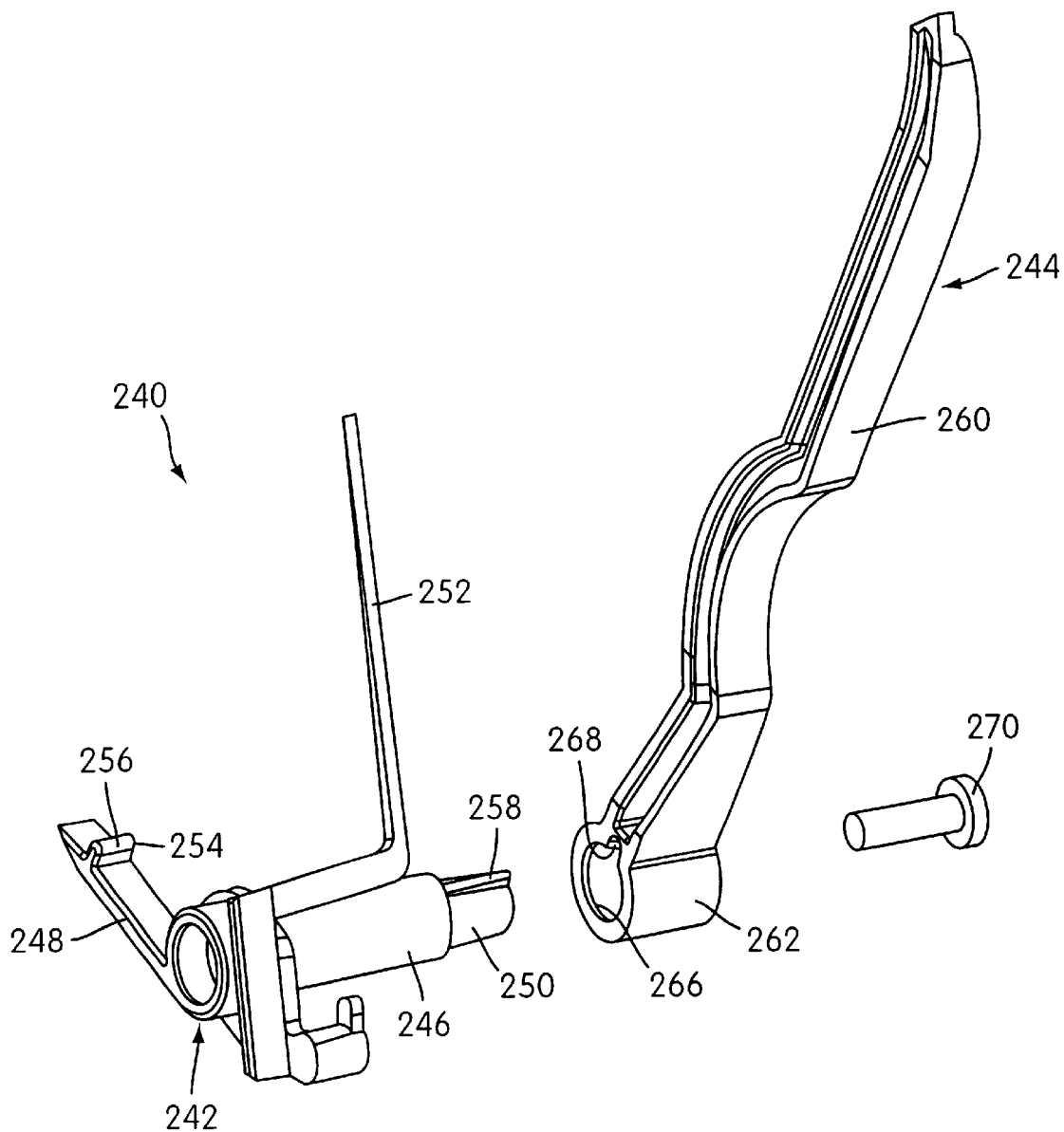
FIG. 16 is an exploded view of the gauge assembly of FIG. 9.

As most clearly shown in FIG. 16, the indicator mounting portion 250 of the supply roll monitor 242 is received within the opening 266 of the supply level indicator 244 with the elongated protrusion 258 of the monitor 242 received with the slot 268 of the indicator 244. The monitor 242 and the indicator 244 may be secured in this position by a fastener 270, such as a screw, that extends through the openings 264, 266 in the indicator 244 and into a cooperating opening provided in the mounting portion 250 of the monitor 242. As a result, the indicator 244 is fixedly connected to the monitor 242 such that rotational movement of the monitor 242 about the axis of the spindle portion 246 is directly transferred to the indicator 244.

Similar to the above-described embodiment, the frame 12 comprises an outer decorative shell (not illustrated) and an internal sub-frame 158 (only a portion illustrated). The sub-frame 158 includes a pair of opposing side walls, only the side wall 160 being illustrated. The side wall 160 has an opening 163 adjacent the lower edge thereof. The side wall 160 also includes an anchoring structure 165 formed on an interior surface thereof (See FIGS. 11 and 12).

Figure 11:
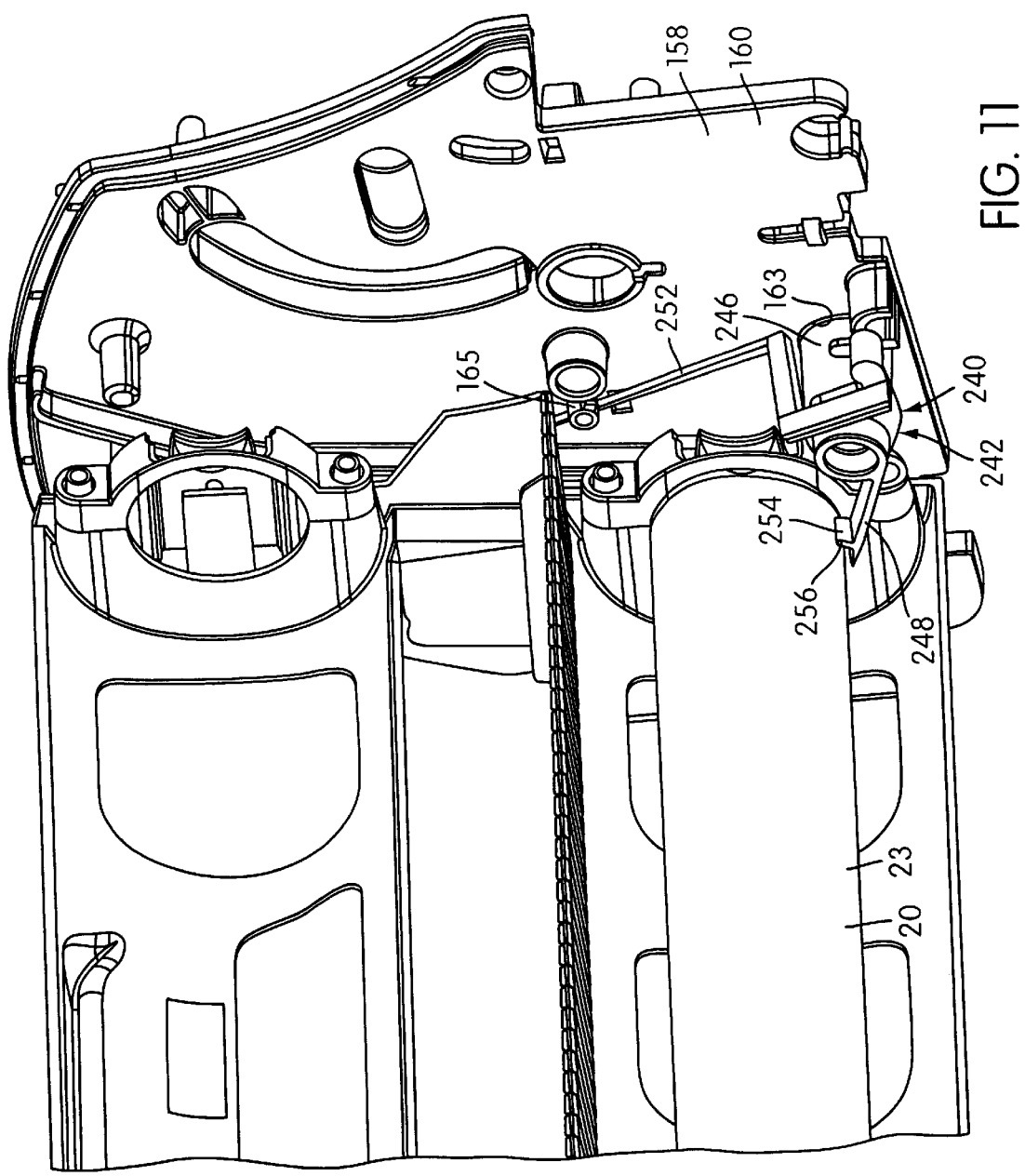
FIG. 11 is another perspective view illustrating the gauge assembly of FIG. 9 indicating a substantially empty amount of stock material remaining on a feed roll of the master processing apparatus.
Figure 12:
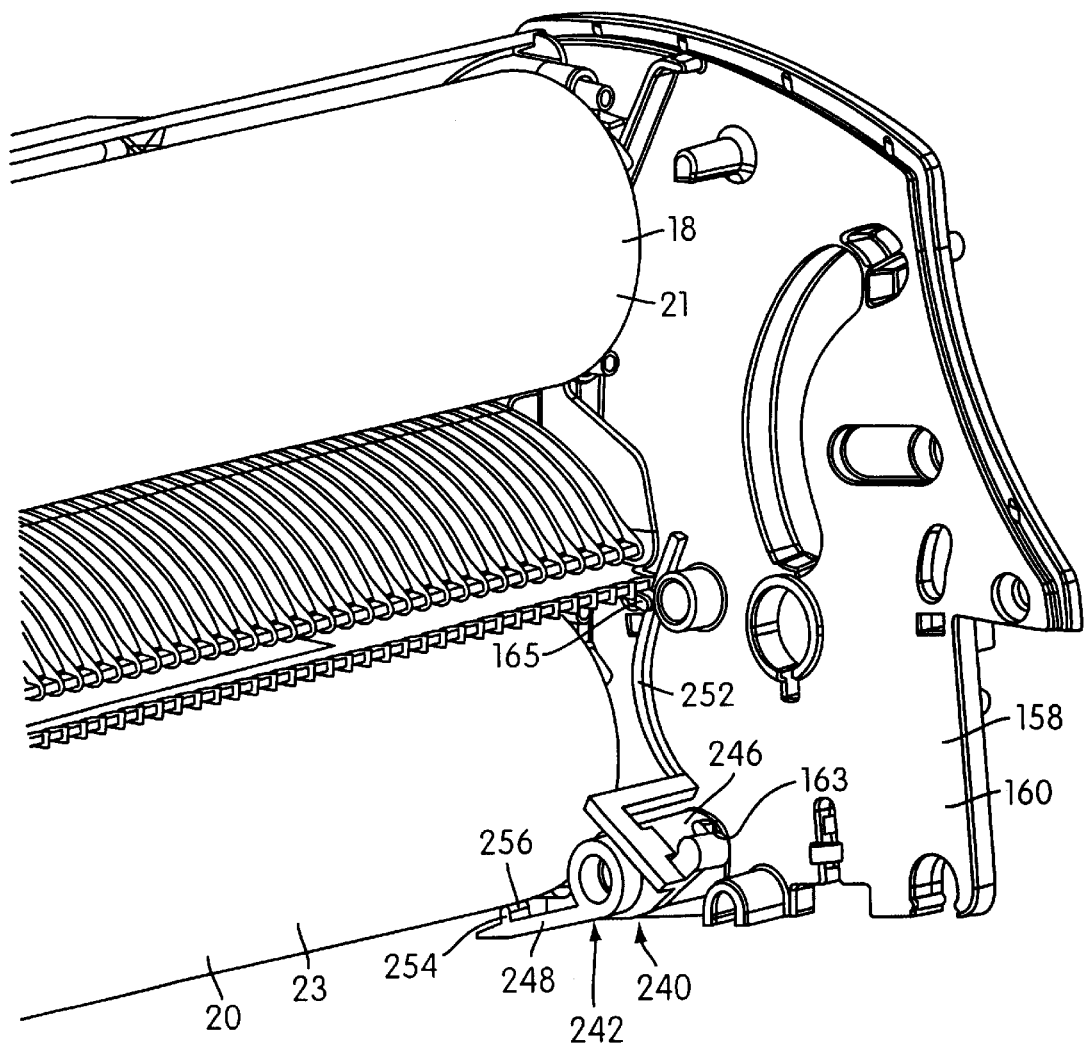
FIG. 12 is another perspective view illustrating the gauge assembly of FIG. 9 indicating a substantially full amount of stock material remaining on a feed roll of the master processing apparatus.

The gauge assembly 240 is mounted to the frame 12 by inserting the mounting portion 250 of the supply roll monitor 242 through the opening 163 in the side wall 160. The opening 163 is configured such that the spindle portion 246, which has a larger cross sectional dimension than the mounting portion 250, does not extend therethrough. As a result, the free end of the biasing portion 252 may be secured to the anchoring structure 165 on the side wall 160 and the stock material engaging surface 256 of the stock material engaging portion 248 may be engaged with the stock material 23 of the feed roll 20, as shown in FIGS. 11 and 12. Then, the mounting portion 262 of the indicator 244 is secured to the mounting portion 250 of the monitor 242 such that the pointing arm 260 is positioned adjacent the outwardly facing surface of the side wall 160. It should be noted that the gauge assembly 240 may be mounted on either of the pair of opposing side walls.

The monitor 242 is configured and positioned such that, as the feed roll 20 is unwound during the master processing operation, the monitor 242 rotates relative to the frame 12 (in a clockwise direction as illustrated in FIGS. 11 and 12) which rotates the indicator 244 connected therewith. Specifically, the stock material engaging surface 256 of the monitor 242 moves to remain in the continuous engagement with the stock material 23 of the feed roll 20 due to the biasing from the biasing portion 252. The rotation of the monitor 242 rotates the pointing arm 260 relative to the frame 12 (in a counter-clockwise direction as illustrated in FIGS. 9 and 10) to provide the continuous indication of the amount of stock material 21, 23 remaining on the feed rolls 18, 20.

The biasing portion 252 of the monitor 242 may be replaced with a separate torsion spring. In this embodiment, the torsion spring would have one tang member secured to the supply roll monitor 242 and the other tang member secured to the anchoring structure 165 of the frame 12.

Similar to the previous embodiment of the gauge assembly, the pointing arm 260 is enclosed within the outer decorative shell of the frame 12 (not shown). The outer decorative shell includes a transparent portion positioned such that the pointing arm 260 is visible through the transparent portion. As a result, the user can observe the movement of the pointing arm 260 relative to the frame 12 to determine the amount of stock material 21, 23 remaining.

The transparent portion may include measurement indicia thereon. The pointing arm 260 would move relative to the transparent portion and hence the measurement indicia thereon during the master processing operation to provide the indication of the amount of stock material 21, 23 remaining on the feed rolls 18, 20.

Preferably, the measurement indicia indicates a length of stock material 21, 23 remaining on the feed rolls 18, 20 (i.e., 60 ft., 30 ft., etc.). Because the indicator 244 has a direct connection with the monitor 242, the indicator 244 provides a linear indication of the amount of stock material 21, 23 remaining on the feed rolls 18, 20. More specifically, 60 ft feed rolls will read 60 ft by the gauge assembly 240 when it is initially installed within the frame 12. As the feed rolls 18, 20 are unwound, the gauge assembly 240 will continuously monitor the amount of stock material 21, 23 remaining on the feed rolls 18, 20 with the pointing arm 260 moving relative to the transparent portion of the frame 12 to read 50 ft, 40 ft, etc. Likewise, 30 ft feed rolls will read 30 ft by the gauge assembly 240 when it is initially installed within the frame 12. As the feed rolls 18, 20 are unwound, the gauge assembly 240 will continuously monitor the amount of stock material 21, 23 remaining on the feed rolls 18, 20 with the pointing arm 260 moving to read 20 ft, 10 ft, etc. FIGS. 9 and 11 show the gauge assembly 240 indicating a substantially empty amount of stock material 21, 23 remaining on a feed rolls 18, 20 (i.e., 0 ft.) and FIGS. 10 and 12 show the gauge assembly 240 indicating a substantially full amount of stock material 21, 23 remaining on a feed rolls 18, 20 (i.e., 60 ft.).

In the previous embodiment, the gauge assembly 140 would read Full (F) when both 30 ft and 60 ft feed rolls were initially installed, for example. As the 30 ft feed roll was unwound, the pointing arm 168 would continuously move relative to the frame 12 towards the Empty (E) marking. However, the pointing arm 168 would remain at the Full (F) marking for the 60 ft feed roll until the 60 ft feed roll had 30 ft of stock material remaining. Then, the pointing arm 168 would continuously move towards the Empty (E) marking. Alternatively, the arrangement could be such that the 60 ft. roll would read full (F) and the 30 ft. roll would read half-full at the start.

Thus, both gauge assemblies 140, 240 continuously monitor the amount of stock material 21, 23 remaining on the feed rolls 18, 20 and continuously indicate to the user the amount of stock material 21, 23 remaining on the feed rolls 18, 20 as the stock materials 21, 23 are being unwound. However, although both types of embodiments and variations thereof are within the scope of the invention, the embodiment of gauge assembly 240 provides a more precise indication of the amount of stock material 21, 23 remaining on feed rolls 18, 20 regardless of the size feed rolls installed within the frame 12.

It can thus be appreciated that the objectives of the present invention have been fully and effectively accomplished. The foregoing specific embodiments have been provided to illustrate the structural and functional principles of the present invention and are not intended to be limiting. To the contrary, the present invention is intended to encompass all modifications, alterations, and substitutions within the spirit and scope of the appended claims.

What is claimed is:

1. A master processing apparatus for use with a pair of removable feed rolls, the removable feed rolls carrying a supply of stock material to be unwound, at least one of the stock materials having a layer of adhesive provided thereon, said apparatus comprising:

a frame constructed and arranged to removably mount the feed rolls;

a master processing assembly constructed and arranged such that, when the feed rolls are removably mounted to said frame, a master can be inserted into said master processing assembly together with the stock materials unwound from their respective feed rolls and disposed on opposing sides of the master;

said master processing assembly being constructed and arranged to perform a master processing operation wherein said master processing assembly causes adhesive bonding between the master and the stock materials being fed into the feed side thereof and subsequently discharges the processed master and stock materials outwardly from a discharge side thereof; and a gauge assembly having (a) a supply roll monitor operable to continuously monitor an amount of stock material remaining on said feed rolls and (b) a user readable supply level indicator operatively connected to said supply roll monitor, said supply level indicator being operable to continuously provide a visual indication to a user of the amount of stock material remaining on the feed rolls as the stock materials are being unwound so as to enable the user viewing the supply level indicator to visually verify the amount of stock material remaining in the feed rolls.

2. A master processing apparatus according to claim 1, wherein said supply level indicator comprises a pointing arm.

3. A master processing apparatus according to claim 2, wherein said supply roll monitor comprises a cam element rotatably mounted to said frame and providing a cam surface at one end thereof and a stock material engaging surface at an other end thereof, said pointing arm being biased in a first direction into continuous engagement with said cam surface of said cam element so as to bias said stock material engaging surface into continuous engagement with the stock material of one of the feed rolls, said pointing arm and said cam surface being configured and positioned such that, as said feed roll is unwound during the master processing operation, said pointing arm moves in the first direction relative to said frame to move the cam surface engaged therewith so that said engaging surface moves to remain in the continuous engagement with the stock material of one of the feed rolls, the movement of the pointing arm relative to the frame in the first direction providing the continuous indication of the amount of stock material remaining on the feed rolls.

4. A master processing apparatus according to claim 3, further comprising a biasing arm connected to said pointing arm, said biasing arm configured and positioned to bias said pointing arm into continuous engagement with said cam surface of said cam element such that said engaging surface of said cam element is biased into continuous engagement with the stock material of one of the feed rolls.

5. A master processing apparatus according to claim 4, wherein said biasing arm and said pointing arm are integrally formed of an elastically deformable material.

6. A master processing apparatus according to claim 2, wherein said supply roll monitor comprises a stock material engaging surface and a resilient arm member, said resilient arm member configured and positioned to bias said engaging surface into continuous engagement with the stock material of one of the feed rolls, said supply roll monitor being rigidly connected to said supply level indicator such that, as said feed roll is unwound during the master processing operation, said pointing arm of said supply level indicator continuously moves relative to said frame as said engaging surface of said supply roll monitor continuously moves to remain in the continuous engagement with the stock material of one of the feed rolls due to biasing from the resilient arm member, the movement of the pointing arm relative to the frame providing the continuous indication of the amount of stock material remaining on the feed rolls.

7. A master processing apparatus according to claim 2, wherein said pointing arm is enclosed within said frame and wherein said frame includes a transparent portion, said pointing arm being visible through said transparent portion.

8. A master processing apparatus according to claim 7, wherein said transparent portion includes measurement indicia thereon, the pointing arm moving relative to the transparent portion and hence the measurement indicia thereon during the master processing operation to provide the indication of the amount of stock material remaining on the feed rolls.

9. A master processing apparatus according to claim 2, wherein said frame includes an opening such that a portion of said pointing arm extends through said opening and is visible to the user.

10. A master processing apparatus according to claim 9, wherein said frame includes measurement indicia thereon, the pointing arm moving relative to the frame and hence the measurement indicia thereon during the master processing operation to provide the indication of the amount of stock material remaining on the feed rolls.

11. A master processing apparatus according to claim 1, wherein said master processing assembly comprises a pair of cooperating nip rollers constructed and arranged to apply pressure to the master and the stock materials during said master processing operation.

12. A master processing apparatus according to claim 1, further comprising an actuator constructed and arranged to affect operation of said master processing assembly.

13. A master processing apparatus according to claim 1, wherein said supply roll monitor is continuously engaged with the stock material of one of said feed rolls so as to continuously monitor the amount of stock material remaining on said feed rolls.

14. A master processing system comprising:

a frame;

first and second feed rolls carrying respective supplies of first and second stock material, said feed rolls being mounted to said frame to enable the stock materials to be unwound from their respective feed rolls, at least one of said stock materials having a layer of adhesive disposed thereon;

a master processing assembly constructed and arranged such that a master can be inserted into said master processing assembly together with the stock materials unwound from their respective feed rolls and disposed on opposing sides of the master;

said master processing assembly being constructed and arranged to perform a master processing operation wherein said master processing assembly causes adhesive bonding between the master and the stock materials being fed into the feed side thereof and subsequently discharges the processed master and stock materials outwardly from a discharge side thereof; and a gauge assembly having (a) a supply roll monitor operable to continuously monitor an amount of stock material remaining on said feed rolls and (b) a user readable supply level indicator operatively connected to said supply roll monitor, said supply level indicator being operable to continuously provide a visual indication to a user of the amount of stock material remaining on the feed rolls as the stock materials are being unwound so as to enable the user viewing the supply level indicator to visually verify the amount of stock material remaining in the feed rolls.

15. A master processing system according to claim 14, wherein said supply level indicator comprises a pointing arm.

16. A master processing system according to claim 15, wherein said supply roll monitor comprises a cam element rotatably mounted to said frame and providing a cam surface at one end thereof and a stock material engaging surface at an other end thereof, said pointing arm being biased in a first direction into continuous engagement with said cam surface of said cam element so as to bias said stock material engaging surface into continuous engagement with the stock material of one of the feed rolls, said pointing arm and said cam surface being configured and positioned such that, as said feed roll is unwound during the master processing operation, said pointing arm moves in the first direction relative to said frame to move the cam surface engaged therewith so that said engaging surface moves to remain in the continuous engagement with the stock material of one of the feed rolls, the movement of the pointing arm relative to the frame in the first direction providing the continuous indication of the amount of stock material remaining on the feed rolls.

17. A master processing system according to claim 16, further comprising a biasing arm connected to said pointing arm, said biasing arm configured and positioned to bias said pointing arm into continuous engagement with said cam surface of said cam element such that said engaging surface of said cam element is biased into continuous engagement with the stock material of one of the feed rolls.

18. A master processing system according to claim 17, wherein said biasing arm and said pointing arm are integrally formed of an elastically deformable material.

19. A master processing system according to claim 15, wherein said supply roll monitor comprises a stock material engaging surface and a resilient arm member, said resilient arm member configured and positioned to bias said engaging surface into continuous engagement with the stock material of one of the feed rolls, said supply roll monitor being rigidly connected to said supply level indicator such that, as said feed roll is unwound during the master processing operation, said pointing arm of said supply level indicator continuously moves relative to said frame as said engaging surface of said supply roll monitor continuously moves to remain in the continuous engagement with the stock material of one of the feed rolls due to biasing from the resilient arm member, the movement of the pointing arm relative to the frame providing the continuous indication of the amount of stock material remaining on the feed rolls.

20. A master processing system according to claim 15, wherein said pointing arm is enclosed within said frame and wherein said frame includes a transparent portion, said pointing arm being visible through said transparent portion.

21. A master processing system according to claim 20, wherein said transparent portion includes measurement indicia thereon, the pointing arm moving relative to the transparent portion and hence the measurement indicia thereon during the master processing operation to provide the indication of the amount of stock material remaining on the feed rolls.

22. A master processing system according to claim 15, wherein said frame includes an opening such that a portion of said pointing arm extends through said opening and is visible to the user.

23. A master processing system according to claim 22, wherein said frame includes measurement indicia thereon, the pointing arm moving relative to the frame and hence the measurement indicia thereon during the master processing operation to provide the indication of the amount of stock material remaining on the feed rolls.

24. A master processing system according to claim 14, wherein said master processing assembly comprises a pair of cooperating nip rollers constructed and arranged to apply pressure to the master and the stock materials during said master processing operation.

25. A master processing system according to claim 14, further comprising an actuator constructed and arranged to affect operation of said master processing assembly.

26. A master processing system according to claim 14, further comprising a cartridge including a cartridge body structure, said feed rolls being mounted to said cartridge body structure and said cartridge body structure being removably mounted to said frame.

27. A master processing system according to claim 14, wherein said supply roll monitor is continuously engaged with the stock material of one of said feed rolls so as to continuously monitor the amount of stock material remaining on said feed rolls.

* * * * *